(12) United States Patent
Davis

(10) Patent No.: US 9,424,758 B2
(45) Date of Patent: Aug. 23, 2016

(54) PIVOTABLE VERTICAL VENTILATION TRAINING SYSTEMS AND APPARATUSES

(71) Applicant: Benjamin Davis, Vernonia, OR (US)

(72) Inventor: Benjamin Davis, Vernonia, OR (US)

(*) Notice: Subject to any disclaimer, the term of this patent is extended or adjusted under 35 U.S.C. 154(b) by 422 days.

(21) Appl. No.: 14/146,530

(22) Filed: Jan. 2, 2014

(65) Prior Publication Data
US 2014/0220521 A1    Aug. 7, 2014

Related U.S. Application Data

(60) Provisional application No. 61/761,240, filed on Feb. 6, 2013.

(51) Int. Cl.
*G09B 19/00* (2006.01)

(52) U.S. Cl.
CPC ................................. *G09B 19/00* (2013.01)

(58) Field of Classification Search
USPC ............ 434/72, 74, 79, 219, 226; 52/64, 66
See application file for complete search history.

(56) References Cited

U.S. PATENT DOCUMENTS

| | | | | |
|---|---|---|---|---|
| 5,152,109 A * | 10/1992 | Boers | ........................ | E04H 3/24 296/26.02 |
| 6,799,975 B1 * | 10/2004 | Dunn | ..................... | G09B 19/00 434/219 |
| 6,877,988 B2 * | 4/2005 | Phillips | .................. | G09B 19/00 434/219 |
| 6,889,473 B2 * | 5/2005 | Westra | .................... | E04B 2/827 16/87 R |
| 7,074,043 B1 * | 7/2006 | Jacobson | ............... | G09B 19/00 434/219 |
| 7,789,666 B2 * | 9/2010 | Sovine | ................... | G09B 9/003 434/226 |
| 7,901,212 B2 * | 3/2011 | Quinn | ................ | A62C 99/0081 434/226 |
| 7,967,326 B2 * | 6/2011 | Klementowicz, III | | G09B 19/00 280/656 |
| 8,360,782 B1 * | 1/2013 | Temple | .................. | G09B 19/00 434/226 |
| 8,435,039 B2 * | 5/2013 | Paganini | ............ | A62C 99/0081 434/226 |
| 8,622,744 B2 * | 1/2014 | Lumry | ................. | G09B 23/183 434/226 |
| 8,720,117 B2 * | 5/2014 | Phillips | ..................... | F42B 8/00 434/226 |

* cited by examiner

*Primary Examiner* — Kurt Fernstrom
(74) *Attorney, Agent, or Firm* — Mohr Intellectual Property Law Solutions, PC

(57) ABSTRACT

The present disclosure is directed to a simulated roof vertical ventilation training apparatus configured to be pivotably attached to a simulated roof. In some examples, the vertical ventilation training apparatus includes a frame pivotably mounted to an exposed rafter of the simulated roof. The frame is moveable between an open position and a closed position. The edges of the frame are configured to engage with at least one disposable support member to maintain the frame in a closed position. The disposable support member is configured to be cut by a user with a hand tool to allow pivot of the frame into the open position.

20 Claims, 7 Drawing Sheets

PIVOTABLE VERTICAL VENTILATION TRAINING SYSTEMS AND APPARATUSES

CROSS REFERENCE TO RELATED APPLICATIONS

This application claims priority to copending U.S. Provisional Application Ser. No. 61/761,240, filed on Feb. 6, 2013, which is hereby incorporated by reference for all purposes.

BACKGROUND

The present disclosure relates generally to systems and apparatuses for training firefighters in vertical ventilation. In particular, pivotable vertical ventilation training systems and apparatuses are described.

Vertical ventilation is an operation performed on emergency scenes that provides the firefighters a means of removing smoke and super-heated gases from a structure. During a fire the smoke and gases rise and collect in the attic, void spaces, and along the ceiling in a structure. Ventilation is typically done by cutting approximately four foot by four foot square holes in the roof of the structure, creating a path for these gases to exit. This operation requires several firefighters to access the roof, locate the ideal location for the ventilation hole, cut through the roofing material (typically done with a chain saw), and then clear the hole of any debris. Because this operation is done on top of structures with power equipment, the firefighters are at higher risk of injury. Therefore, many fire departments have created simulated roof structures that are on ground level and allow firefighters to practice the operation in a more controlled and safe environment.

Simulated roof structures are usually built out of standard wood materials, to the same specifications as the typical residential roof structure. The framework is usually built of standard 2×6 wood rafters spaced two feet apart and covered with plywood or other sheeting material. This simulated structure is commonly known as a "roof prop" in the fire service. These roof props may be small and portable, mobile trailers, or large multiple story structures. These current roof props use one or more pieces of 4'×8' sheeting that are replaceable. The replaceable sheets are where the firefighter cuts the ventilation hole during training scenario. U.S. Patent Application Publication No. 2011/0143324A1 to Paganini shows one design of these simulated roof systems and how they are used to train firefighters. The complete disclosure of the above patent application is herein incorporated by reference for all purposes.

Known vertical ventilation training systems are not entirely satisfactory for the range of applications in which they are employed. For example, existing vertical ventilation training systems require firefighters to cut a ventilation hole into the middle of a 4×8 sheet of material. Therefore, in each training scenario or session at least one entire sheet is used. This creates a waste, disposal, and storage problem for some departments due to high frequency of training.

In another example, after the ventilation hole is cut the remainder of the sheet needs to be removed from the roof and a new sheet secured in place. This can be time consuming depending on the fasteners used to secure each sheet. Because the firefighter cannot begin the next scenario until these sheets are replaced, the entire training exercise is on hold until the prop is fully restored and ready for the next operation. This can waste valuable time during training exercises.

In even more examples, firefighters may be inexperienced in climbing on the sloped roof and in cutting ventilation holes. In these examples, inexperienced firefighters may find it very awkward carrying a 4×8 sheet of replacement material up a sloped roof, even creating a hazardous situation. Placement of the sheet may even require two firefighters working co-operatively. Further, inexperienced firefighters may not know an appropriate size hole to be cut for vertical ventilation.

Thus, there exists a need for vertical ventilation training systems and apparatuses that improve upon and advance the design of known vertical ventilation training systems and apparatuses. Examples of new and useful vertical ventilation training systems and apparatuses relevant to the needs existing in the field are discussed below.

SUMMARY

The present disclosure is directed to a simulated roof vertical ventilation training apparatus configured to be pivotably attached to a simulated roof. In some examples, the vertical ventilation training apparatus includes a frame pivotably mounted to an exposed rafter of the simulated roof. The frame is moveable between an open position and a closed position. The edges of the frame are configured to engage with at least one disposable support member to maintain the frame in a closed position. The disposable support member is configured to be cut by a user with a hand tool to allow pivot of the frame into the open position.

DETAILED DESCRIPTION

Figure 1:
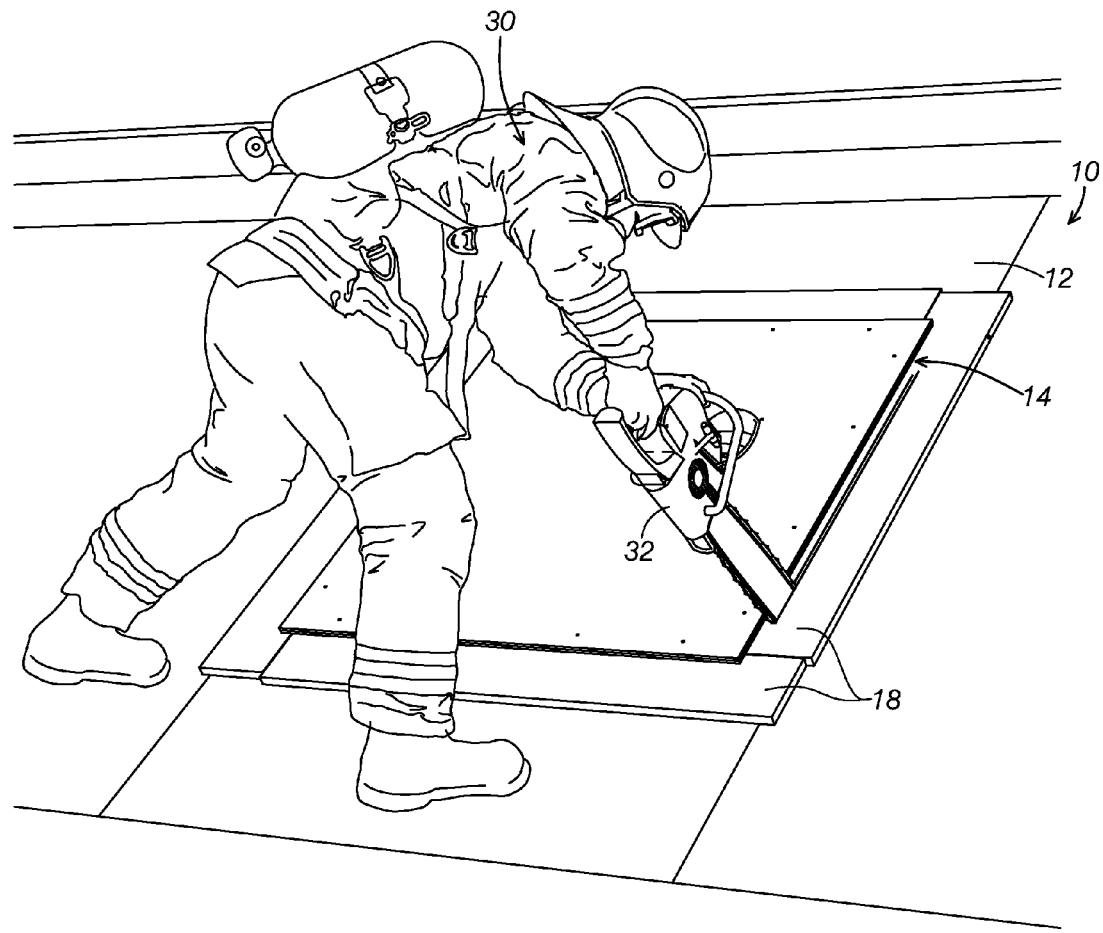
FIG. 1 is a perspective view of a first example of a vertical ventilation training system

The disclosed vertical ventilation training systems and apparatuses will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various vertical ventilation training systems and apparatuses are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-7, a first example of a vertical ventilation system, vertical ventilation system 10, will now be described. Vertical ventilation system 10 includes a simulated roof 12 and a vertical ventilation apparatus 12 disposed within an opening 16 of the simulated roof. The vertical ventilation apparatus is pivotably and releasably mounted to an exposed rafter 22. Disposable support members 18 are engaged with vertical ventilation apparatus 12 in order to maintain the apparatus is a closed position 20. When disposable support members 18 are removed and/or cut by a user, such as a fireperson 30, with a cutting device 32 (e.g., a saw, an axe, etc.), vertical ventilation apparatus 12 pivots into an open position 24.

Vertical ventilation system 10 functions to provide a reusable training device for training firemen in cutting vertical ventilation holes. Primarily, the disposable support members are cut during the training session. Because other components of the training system are reusable for multiple training sessions, there is less waste produced.

Further, the system is faster and easier to prepare for subsequent training sessions because the disposable support members can be smaller pieces of wood and/or board than are used in conventional methods, such as 1'×6' dimensional lumber rather than 4'×8' plywood. Furthermore, the vertical ventilation system can be installed with existing training roofs and used with a variety of vertical ventilation techniques (e.g., coffin cut, trench cut, etc.). Further still, the vertical ventilation apparatus provides a visual cutting guide for training firefighters to cut an appropriately sized hole for removal smoke and super-heated gases from during a structure fire.

Figure 2:
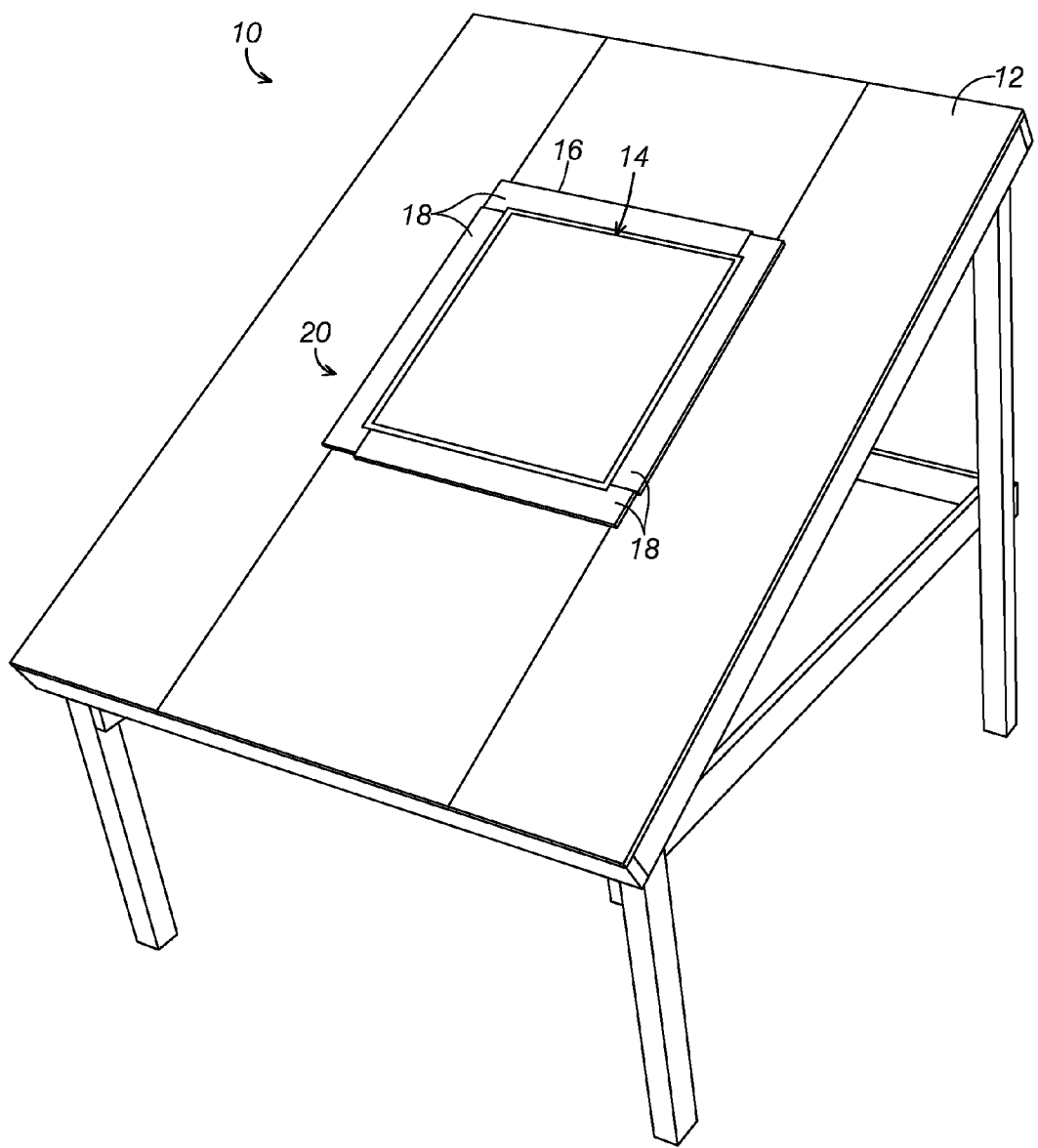
FIG. 2 is an isometric view of a first example of a vertical ventilation training apparatus in a closed configuration.
Figure 3:
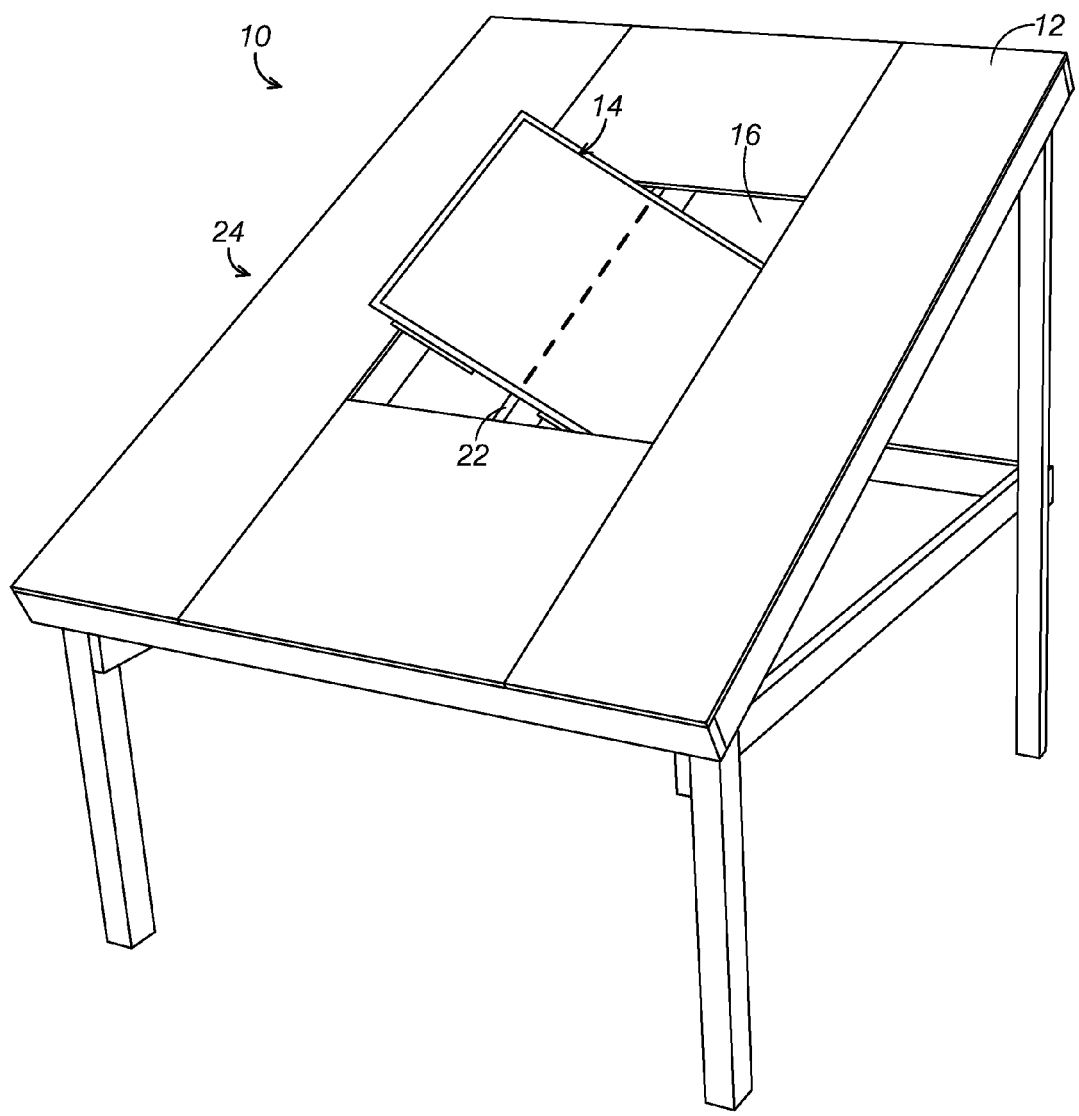
FIG. 3 is an isometric view of the vertical ventilation training apparatus of FIG. 2 in an open configuration.

As can be seen in FIGS. 1-3, vertical ventilation apparatus 14 is used in combination with a simulated roof 12. In alternate embodiments, the vertical ventilation apparatus may be mounted to a roof of a training house (not a simulated roof). Vertical ventilation apparatus 14 is disposed within opening 16 of the roof. Both of vertical ventilation apparatus 14 and opening 16 have a generally rectangular shape, and more specifically a generally square shape. As described above, vertical ventilation apparatus 14 is pivotably and releasably mounted to exposed rafter 22, allowing vertical ventilation apparatus 14 to move between closed position 20 and open position 24.

As depicted in FIGS. 1 and 2, disposable support members 18 engage with edges of vertical ventilation apparatus 14 in order to maintain closed position 20 for vertical ventilation apparatus 14. Disposable support members 18 can be cut, chopped, or otherwise destroyed during a firefighter training session by fireperson 30 using cutting device 32. FIG. 1 depicts fireperson 30 actively performing cutting of the disposable members during a training and/or demonstration session.

After cutting of support members 18, the edges of vertical ventilation training apparatus 14 are substantially free. Fireperson 30 can then pivot vertical ventilation apparatus 14 into open position 24 by either stepping onto, pushing by hand, or using a device to press on one side of the apparatus (either of the right or left lateral sides of the apparatus). Alternatively, support members 18 can be removed, as shown in FIG. 2, and vertical ventilation apparatus 14 can be pivoted into open position 24.

Turning now to FIGS. 4-7, vertical ventilation apparatus 14 includes a frame 34, a plurality of cross member pairs 36, a pivot rod 38, a plurality of brackets 40, a cutting guide 42, a plurality of bracing tabs 44, and a plurality of support member guides 46. Frame 34 includes first and second longitudinal members 48 and 50 and first and second lateral members 52 and 54.

Figure 4:
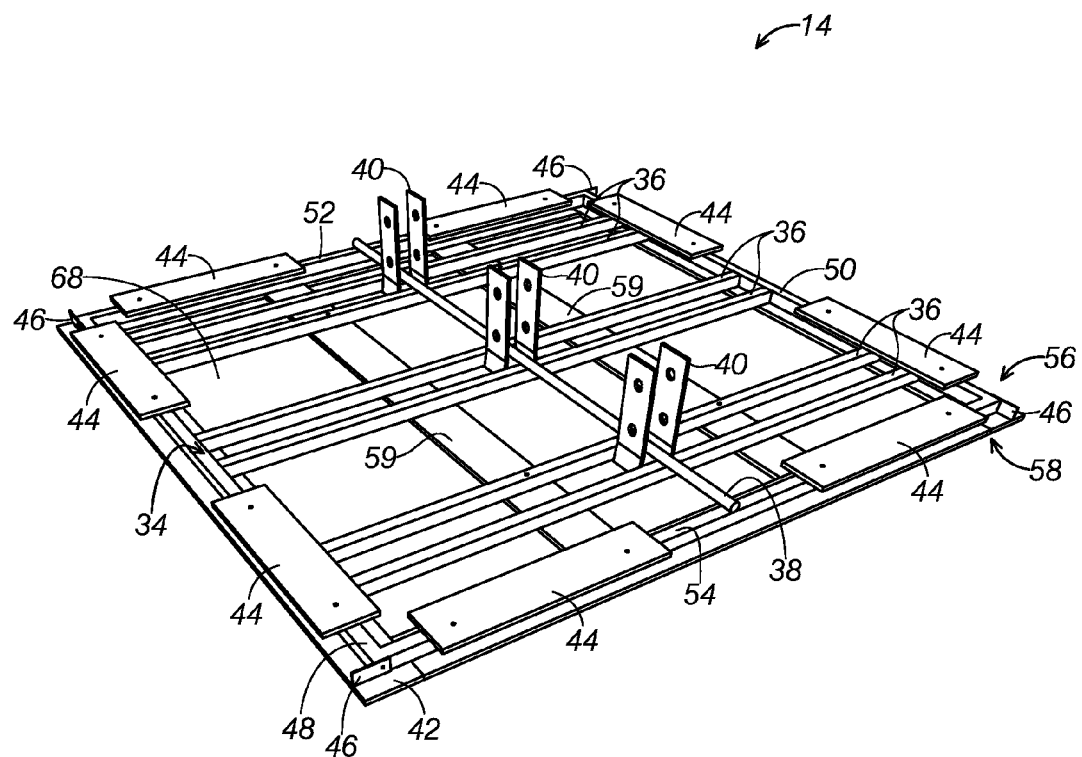
FIG. 4 is a perspective of an underside of the vertical ventilation training apparatus shown in FIG. 2.
Figure 6A:
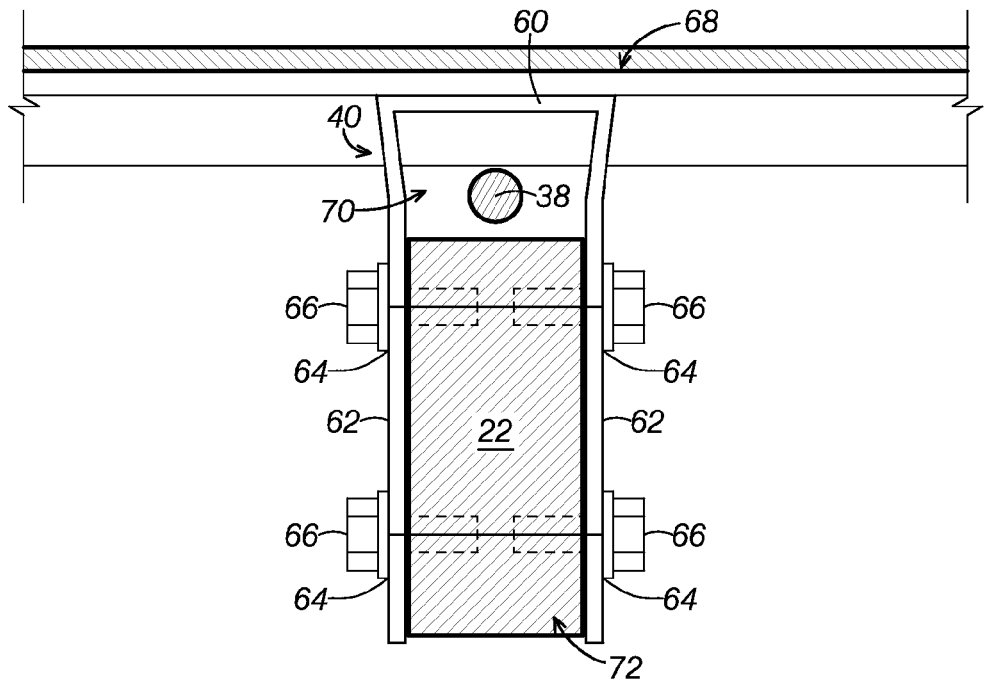
FIGS. 6A and 6B are cross sectional views of a bracket releasably fixed to a rafter.
Figure 6B:
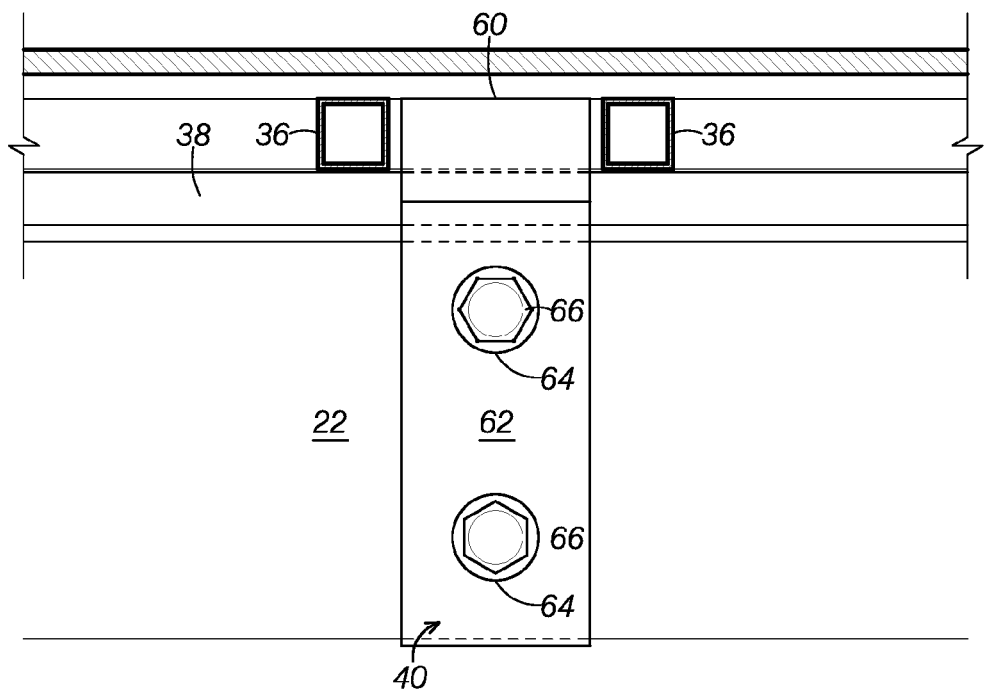
Figure 7:
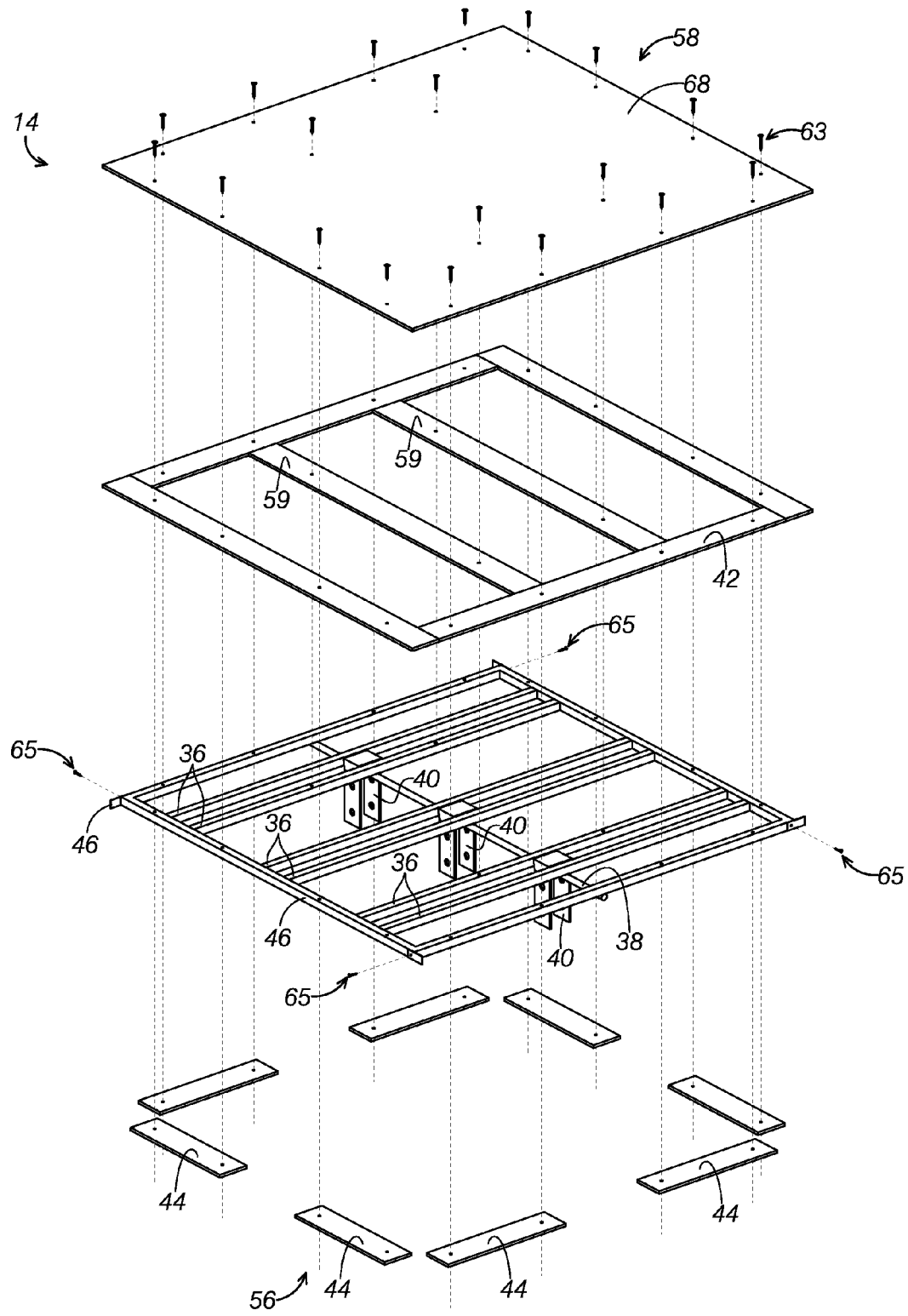
FIG. 7 is an exploded view of the vertical ventilation training apparatus shown in FIGS. 2-5.

As shown in FIGS. 4, 6, and 7, cross member pairs 36 extend between and are fixed to first and second longitudinal members 48 and 50. Pivot rod 38 extends between and is fixed to a center of first and second lateral members 52 and 54. Cross member pairs 36 are fixed to frame 34 within the plane of the frame, while pivot rod 38 is fixed to a bottom side 56 of frame 34.

In the present example, the frame, the cross members, the pivot bar, and the brackets are comprised of a metallic material (e.g., steel, aluminum, iron, etc.). In this example, the cross members and the pivot rod are welded to the frame. In alternate examples, the cross members and the pivot rod can be fixedly secured to the frame by a different attachment mechanism (e.g., secured by threaded attachment members, bolts, etc.).

Also shown in FIGS. 4, 6, and 7, bracing tabs 44 are fixed to bottom side 56 of frame 34 via a plurality of attachment members 63 and extend outward from a periphery of the frame. Cutting guide 42 is fixed to a top side 58 of frame 34 via the plurality of attachment members 63 and extends outward from a periphery of the frame. Thus, a periphery of the bracing tabs and the cutting guide extends beyond the periphery of the frame. In the present example, the cutting guide is one piece (with two supporting cross members 59) and the bracing tabs include two bracing tabs fixed to each of the frame members 48, 50, 52, and 54. In alternate examples, the cutting guide may include separate pieces and/or the bracing tabs can comprise one piece.

Support member guides 46 extend away from each corner of the frame and are alternately continuous with one of first and second longitudinal members 48 and 50 and lateral members 52 and 54. Support member guides 46 are attached to frame 34 via a plurality of attachment members 64. In alternate embodiments, the support member guides can be eliminated from the vertical ventilation apparatus.

Figure 5:
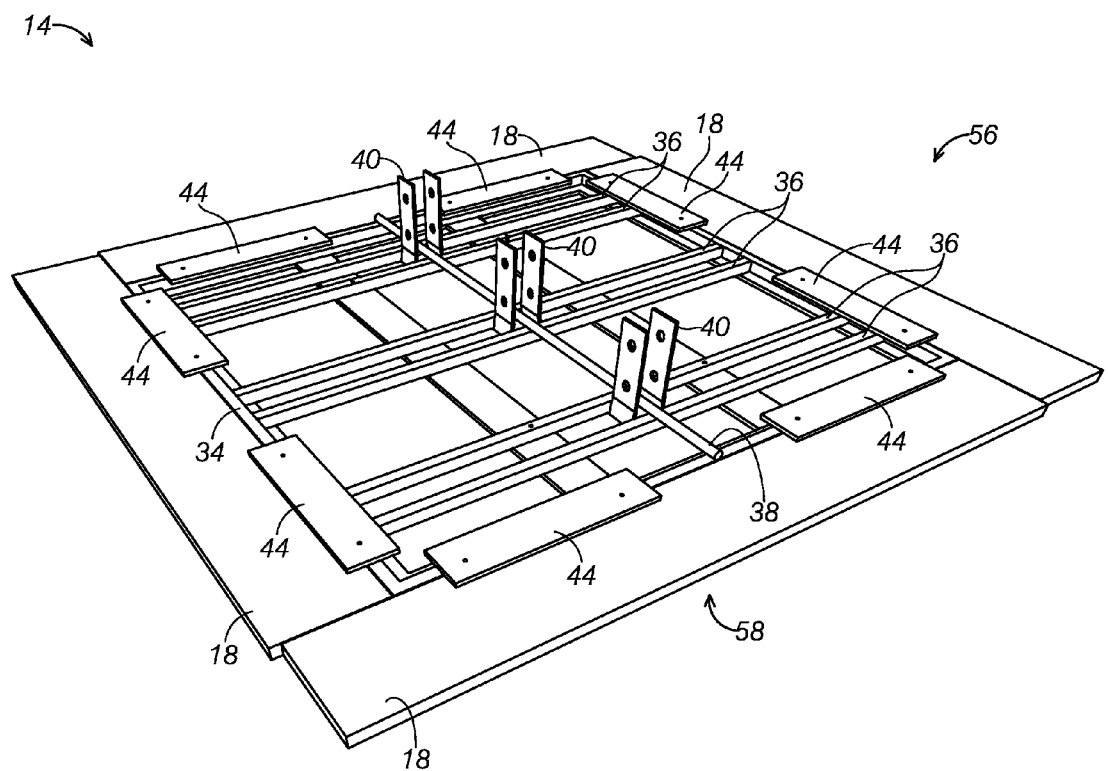
FIG. 5 is a perspective of an underside of the vertical ventilation training apparatus shown in FIG. 2, depicting the apparatus engaged with disposable support members.

As shown in FIG. 5, cutting guide 42, bracing tabs 44, and the periphery of frame 34 are configured to receive disposable support members 18. In other words, a longitudinal edge of each of disposable support members 18 is sandwiched between cutting guide 42 and bracing tabs 44, and abutted to the periphery of frame 34. A location of the support member engagement is guided by support guides 46. Thus a lateral edge of each of disposable support members 18 is abutted to one of the support guides 46.

As shown in FIG. 2, engagement of disposable support guides 18 with vertical ventilation apparatus 14 (i.e., receiving of support guide longitudinal edges by the cutting guide, the bracing tabs, and the periphery of the frame) maintains the apparatus in closed position 20. A bottom surface of disposable support members 18 makes abutting surface to surface contact with a top surface of simulated roof 12. Thus, vertical ventilation apparatus is restricted from opening even if one of the lateral side of the apparatus is pushed, stepped on, or otherwise has a downward force exerted upon it. It will be appreciated that if a very strong downward force (i.e., a force capable of breaking the disposable support members) is exerted upon the vertical ventilation apparatus, it may be moved into the open position.

During vertical ventilation training and cutting of the disposable support members the cutting guide is configured to provide a visual indication for a location of cutting into the disposable support members for the user. Thus, during training, the cutting guide, the bracing tabs, and/or the support member guides may be accidently cut into. Therefore, in the present example the cutting guide, the bracing tabs, and the support member guides are comprised of a non-metalic material that can be cut into without damaging the cutting tool, such as ultra high molecular weight polyethylene (UHMW). In other examples, the cutting guide, the bracing tabs, and the support member guides can be comprised of another cuttable material, such as wood, plastic, rubber, etc.

Turning to FIGS. 6A and 6B, a configuration of brackets 40 will now be described. FIG. 6A shows a cross section profile view of bracket 40 releasably fixed to rafter 22. Bracket 40 includes a bridge 60 at a top portion of the bracket and two downwardly extended walls 62 that abut and/or brace side surfaces of rafter 22. Each of walls 62 includes through holes 64, through which attachment members 66 are threaded for releasable attachment of the bracket to the rafter. In the present example, a bottom edge of bracket 40 is aligned with a bottom edge of rafter 22. In alternate examples, the bottom edge of the bracket may extend past or may not extend to a bottom edge of the rafter.

Bridge portion 60 has a flat top surface, which is, in this example of FIGS. 6A and 6B proximal to a cover plate 68. As shown in FIG. 7, cover plate 68 is a sheet that is attached to top side 58 of frame 34 (cutting guide 42 being disposed between the cover plate and the frame) via attachment members 63. Cover plate 68 is substantially the same size and shape as frame 34. In some examples, in the closed position, the cover plate may be in contact with the top surface of the bridge and the pivot rod can be suspended above the rafter. In other examples, in the closed position, there is a space between the cover plate and the top surface of the bridge and the pivot rod rests on the top surface of the rafter.

In the present example, cover plate 68 is comprised of a metallic material, such as those described above. In alternate examples, the cover plate can be comprised of another material (e.g., wood, plastic, etc.). In yet other examples, the cover plate can be welded to the frame or otherwise attached directly to the frame and the cutting guide can be releasably attached to the top of the cover plate.

Returning to FIGS. 6A and 6B, pivot rod 38 is disposed within a pivot rod space 70 below bridge 60. Pivot rod 38 is rotatable, moveable, and/or pivotable within pivot rod space 70 (moveable between closed position 20 and open position 24). As stated above, a bottom surface of cover plate 68 is abutted to and in surface-to-surface contact with a top surface of bridge 60.

In closed position 20, bridge 60 supports the vertical ventilation apparatus (in a vertical direction) when in the closed position by supporting cover plate 68. FIG. 6B depicts cross bar pair 36, each of cross member pair 36 is disposed near and/or abutted to an opposing lateral edge of bridge 60. In other words, each of the cross bar members is abutted to one side of the bracket and restricts longitudinal movement of the vertical ventilation apparatus (i.e., longitudinal movement of the pivot rod through the brackets).

When the vertical ventilation apparatus is moved or is moving into open position 24, cover plate 68 is tipped off of the bridge in either lateral direction (to the right or to the left) and comes to abut and make surface-to-surface contact with one of the walls 62 (not specifically shown). Cross member pair 36 slides around lateral edges of bracket 40 (lateral edges of bridge 60 and walls 62) and guides movement in a lateral direction into open position 24. Simultaneously, cross member pair 36 restricts longitudinal movement of pivot rod 38 and the vertical ventilation apparatus. In open position 24, each of cross member pair 36 is disposed near and/or abutted to an opposing lateral edge of one of the walls 62 (not specifically shown).

One example for a method of use of vertical ventilation system 10 will now be described. Firstly, the vertical ventilation apparatus is assembled, as shown in the exploded view of FIG. 7. Generally, bracing tabs 44 are attached to an underside (56) of frame 34, and cutting guide 42 and cover plate 68 are attached to a top side (58) of frame 34 via attachment members 62. In one example, attachment members 63 are threaded screws that are threaded through overlaying insertion holes in each of the vertical ventilation apparatus components. Optionally, support member guides 46 can be attached to frame 34 via attachment members 65.

Next, brackets 40 are inserted over and/or hooked around pivot bar 38 so that the pivot bar contacts an underside of bridge 60. Vertical ventilation apparatus 14 is then positioned over opening 16 in simulated roof 12 so that pivot bar 38 and brackets 40 are aligned over rafter 22. Rafter 22 is inserted into a rafter receiving space 72 of brackets 40 and a bottom of brackets 40 is aligned with a bottom of rafter 22. The brackets can be simultaneously engaged with the rafter, or a first bracket (such as the center bracket) can be first engaged with the rafter and then other brackets can be placed over the pivot rod and the rafter while the apparatus is in the open position.

Attachment members 66 are inserted through and secured in holes 64 on a first lateral side. The apparatus can then be pivoted to the open position on the opposing lateral side, and attachment members 66 can be inserted through and secured in holes 64 on the second lateral side. After insertion of the attachment members, the vertical ventilation training apparatus is installed and ready for use in a vertical ventilation training session.

For setting vertical ventilation apparatus 14 for a training session, the apparatus is first moved into the closed position. A longitudinal side of a first disposable support member 18 is inserted between and engaged with cutting guide 42 and bracing tabs 44 on a first side of frame 34. Optionally, if support member guides 46 are included, a lateral edge of the first disposable support member 18 is abutted to the support member guide.

Subsequent disposable support members 18 are engaged with each side of the frame in the same manner. Bottom surfaces of the engaged disposable support members make surface-to-surface contact with the top surface of the simulated roof and maintain the vertical ventilation training apparatus in the closed position. Optionally, the disposable support members can be releasably fixed to the simulated roof with additional attachment members. For example, four wood screws can be inserted through each disposable support member and the simulated roof.

A firefighter can then climb onto the simulated roof with a cutting device. Each disposable support member can then be cut or otherwise destroyed with the cutting device. After the disposable support members are cut, a downward force can be exerted on one of the lateral sides of the cover plate (i.e., a top surface of the apparatus) by stepping on, pressing by hand, and/or using a force exerting device. The apparatus will then rotate/pivot into the open position.

The remaining portions of the destroyed disposable support members are then removed from the vertical ventilation training apparatus. The cutting guide and the bracing tabs can be inspected. If they are overly cut and/or worn down, the apparatus can be removed from the roof by releasing the brackets. The cutting guide the bracing tabs can be then be replaced and the apparatus can be reattached to the simulated roof. In either case, a new set of disposable support members can be engaged with each side of the apparatus, and a new training session can initiated.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A simulated roof vertical ventilation training apparatus configured to be pivotably attached to a simulated roof, the apparatus comprising:
   a frame pivotably mounted to an exposed rafter in an opening of the simulated roof, the frame having a top side on an exterior side of the simulated roof and a bottom side on an interior side of the simulated roof, the frame being pivotable between an open position and a closed position,
   wherein edges of the frame are configured to engage with at least one disposable support member to maintain the frame in the closed position, and
   the at least one disposable support member is configured to be cut by a user with a hand tool to allow pivot of the frame into the open position.

2. The simulated roof vertical ventilation training apparatus of claim 1, wherein the frame comprises a first longitudinal member, a second longitudinal member, a first lateral member, a second lateral member, ends of the first and second lateral members joined by ends of the first and second longitudinal members, the first and second lateral members and the first and second longitudinal members substantially forming a rectangular shape.

3. The simulated roof vertical ventilation training apparatus of claim 2, further comprising a pivot rod, a first end of the pivot rod fixed to a center of the first lateral member on the bottom side of the frame and a second end of the pivot rod fixed to a center the second lateral member on the bottom side of the frame.

4. The simulated roof vertical ventilation training apparatus of claim 3, further comprising at least one pivot rod bracket for releasably attaching the pivot rod to an exposed rafter of the simulated roof, the pivot rod and the at least one pivot rod bracket configured to allow pivot of the frame around the exposed rafter.

5. The simulated roof vertical ventilation training apparatus of claim 4, wherein each of the at least one pivot rod bracket has a bridge on a top side of the bracket that extends over the pivot rod and two vertical walls, each of the two vertical walls extending downward from an opposing end of the bridge, the two vertical walls having a rafter attachment mechanism, the two vertical walls configured to make surface-to-surface contact with vertical walls of the exposed rafter, the rafter attachment mechanism configure to releasably attach the at least one pivot rod bracket to the exposed rafter, the pivot rod captured between the bridge, the two vertical walls, and a top side of the exposed rafter when the pivot rod bracket is fixed to the exposed rafter.

6. The simulated roof vertical ventilation training apparatus of claim 5, further comprising a plurality of cross members, a first end of the plurality of cross members fixed to the first longitudinal cross members and a second end of the plurality of cross members fixed to the second longitudinal member.

7. The simulated roof vertical ventilation training apparatus of claim 6, wherein the plurality of cross members are at least one cross member pair, the at least one cross member pair being a first cross member and a second cross member, the first cross member aligned with and proximal to a first edge of the at least one pivot rod bracket, the second cross member aligned with and proximal to a second edge of the at least one pivot rod bracket, the at least one cross member pair configured to support pivot of the frame and the pivot rod around the at least one pivot rod bracket and the exposed rafter, the at least one cross member pair further configured to restrict longitudinal movement of the frame during pivot.

8. The simulated roof vertical ventilation training apparatus of claim 7, wherein the at least one pivot rod bracket comprises a plurality of pivot rod brackets, each of the plurality of pivot rod brackets equally spaced over a length of the pivot rod, and the at least one cross member pair is a plurality of cross member pairs, the plurality of cross member pairs configured to support pivot of the frame and the pivot rod around the plurality of pivot rod brackets and the exposed rafter, the plurality of cross member pairs further configured to restrict longitudinal movement of the frame during pivot.

9. The simulated roof vertical ventilation training apparatus of claim 2, further comprising a plurality of support member guides, each of the plurality of support member guides extending from a corner of the frame, a first surface of each of the plurality support member guides being continuous with one of the first and second longitudinal members and the first and second lateral members, continuity with longitudinal members and lateral members alternating between adjacent support member guides, the first surface of the support member guide configured to abut a longitudinal edge of the at least one disposable support member, a second surface of the support member guide configured to abut a lateral edge of the at least one disposable support member.

10. The simulated roof vertical ventilation training apparatus of claim 1, further comprising a cutting guide releasably fixed to the frame, a perimeter of the cutting guide extended beyond a perimeter of the frame, the perimeter of cutting guide being a visual cutting guide to provide the user an indication of where to cut into the at least one disposable support member with the hand tool.

11. The simulated roof vertical ventilation training apparatus of claim 10, wherein the cutting guide is comprised non-metalic material that will not damage the hand tool if cut into by the hand tool.

12. The simulated roof vertical ventilation training apparatus of claim 10, further comprising a plurality of bracing tabs, the plurality of bracing tabs fixed to the bottom side of the frame, the plurality of bracing tabs extended outwardly from the frame, the plurality of bracing tabs and the cutting guide configured to receive and sandwich longitudinal edges of the at least one disposable support member.

13. The simulated roof vertical ventilation training apparatus of claim 1, further comprising a cover plate and a cutting guide releasably fixed to the top side of the frame, the cutting guide disposed between the cover plate and the frame, a perimeter of the cutting guide extended beyond a perimeter of the frame and a perimeter of the cover plate, the perimeter of cutting guide being a visual cutting guide to provide the user an indication of where to cut into the simulated roof with the hand tool.

14. A simulated roof vertical ventilation training system, comprising:
a simulated roof having an exterior surface and an interior surface, the simulated roof having a cutout section and an exposed rafter, the exposed rafter being centrally disposed within the cutout section;
a cutting device;
a plurality of disposable support members configured to be cut by a user with the cutting device; and
a vertical ventilation training apparatus disposed within the cutout section of the simulated roof, the vertical ventilation training apparatus having:
a frame, the frame having a top side on the exterior surface of the simulated roof and a bottom side on an interior of the simulated roof, the frame being pivotable between an open position and a closed position, the frame being a substantially rectangular shape having a first longitudinal side, a second longitudinal side, a first lateral side and a second lateral side, each of the first and second longitudinal sides and the first and second lateral sides having a disposable support member attachment mechanism for releasable attachment of one of the plurality of disposable support members,
a pivot rod extended from a center of a first lateral side of the frame to a center of a second lateral side of the frame, the pivot rod fixed to the bottom side of the frame,
a plurality of pivot rod brackets for releasably fixing the pivot rod to the exposed rafter,
a visual cutting guide releasably fixed to the top side of the frame, a perimeter of the visual cutting guide extended past a perimeter of the frame, the visual cutting guide configured to provide the user an indication of where to cut into the plurality of disposable support members, the visual cutting guide being a non-metallic material that will not damage the cutting device if cut into by the cutting device,
wherein at least one of the plurality of disposable support members is releasably attached to each of the first and second longitudinal sides and the first and second lateral sides of the frame via the disposable support member attachment mechanism and makes abutting contact with the exterior surface of the roof to maintain the frame in the closed position, and
the frame is pivotably attached to the exposed rafter via the pivot bar and the plurality of pivot bar brackets, the frame configured to pivot around the exposed rafter into the open position when the plurality of disposable support members are cut by the user with the cutting device.

15. The simulated roof vertical ventilation training system of claim 14, further comprising a plurality of pairs of cross members extended from the first longitudinal side of the frame to the second longitudinal side of the frame, each of the plurality of pairs of cross members having a first cross member and a second cross member, the first cross member aligned with and proximal to a first edge of one of the plurality of pivot rod brackets, the second cross member aligned with and proximal to a second edge of one of the plurality of pivot rod brackets, the at least one cross member pair configured to support pivot of the frame and the pivot rod around the plurality of pivot rod brackets, the at least one cross member pair further configured to restrict longitudinal movement of the frame during pivot.

16. The simulated roof vertical ventilation training system of claim 14, wherein each of the plurality of pivot rod brackets has a bridge on a top side of the bracket that extends over the pivot rod and two vertical walls, each of the two vertical walls extending downward from an opposing longitudinal side of the bridge, the two vertical walls having a rafter attachment mechanism, the two vertical walls configured to make surface-to-surface contact with vertical walls of the exposed rafter, the rafter attachment mechanism configure to releasably attach the at least one pivot rod bracket to the exposed rafter, the pivot rod captured between the bridge, the two vertical walls, and a top side of the exposed rafter when the pivot rod bracket is fixed to the exposed rafter.

17. The simulated roof vertical ventilation training system of claim 14, wherein the disposable support member attachment mechanism comprises a plurality of bracing tabs fixed to a bottom side of the frame and extended outwardly from the perimeter of the frame, the plurality of bracing tabs and the visual cutting guide configured to receive and sandwich longitudinal edges of the plurality of disposable support members.

18. The simulated roof vertical ventilation training system of claim 14, further comprising a plurality of support member guides, each of the plurality of support member guides extending from one corner of the frame, a first surface of each of the plurality support member guides being continuous with one of the first and second longitudinal sides and the first and second lateral sides of the frame, continuity with longitudinal sides and lateral sides alternating between adjacent support member guides, the first surface of the support member guide configured to abut a longitudinal edge of one of the plurality of disposable support members, a second surface of the support member guide configured to abut a lateral edge of one of the plurality of disposable support members.

19. The simulated roof vertical ventilation training system of claim 14, further comprising a cover plate, the cover plate releasably fixed to the top side of the frame, the visual cutting guide disposed between the cover plate and the frame, the perimeter of the visual cutting guide extended beyond a perimeter of the cover plate.

20. A simulated roof vertical ventilation training system, comprising:
a simulated roof having an exterior surface and an interior surface, the simulated roof having a cutout section and an exposed rafter, the exposed rafter being centrally disposed within the cutout section;
a cutting device;

a plurality of disposable support members configured to be cut with the cutting device; and a vertical ventilation training apparatus disposed within the cutout section of the simulated roof, the vertical ventilation training apparatus having:

a frame, the frame having a top side on the exterior surface of the simulated roof and a bottom side on an interior of the simulated roof, the frame being pivotable between an open position and a closed position, the frame being a substantially rectangular shape having a first longitudinal side, a second longitudinal side, a first lateral side and a second lateral side, a pivot rod extending from a center of a first lateral side of the frame to a center of a second lateral side of the frame, the pivot rod fixed to the bottom side of the frame, a plurality of pivot rod brackets for releasably fixing the pivot rod to the exposed rafter, each of the plurality of pivot rod brackets having a bridge on a top side of the bracket that extends over the pivot rod and two vertical walls, each of the two vertical walls extending downward from an opposing longitudinal side of the bridge, the two vertical walls having a rafter attachment mechanism, the two vertical walls configured to make surface-to-surface contact with vertical walls of the exposed rafter, the rafter attachment mechanism configure to releasably attach the at least one pivot rod bracket to the exposed rafter, the pivot rod captured between the bridge, the two vertical walls, and a top side of the exposed rafter when the pivot rod bracket is fixed to the exposed rafter, a plurality of pairs of cross members extending from the first longitudinal side of the frame to the second longitudinal side of the frame, each of the plurality of pairs of cross members having a first cross member and a second cross member, the first cross member aligned with and proximal to a first edge of one of the plurality of pivot rod brackets, the second cross member aligned with and proximal to a second edge of one of the plurality of pivot rod brackets, the plurality of cross member pairs configured to support pivot of the frame and the pivot rod around the plurality of pivot rod brackets, the plurality of cross member pairs further configured to restrict longitudinal movement of the frame during pivot, a cover plate, the cover plate releasably fixed to the top side of the frame, a visual cutting guide releasably fixed to the top side of the frame and disposed between the frame and the cover plate, a perimeter of the visual cutting guide extending past a perimeter of the frame and a perimeter of the cover plate, the visual cutting guide being a non-metalic material that will not damage the cutting device when cut by the cutting device, a plurality of bracing tabs, the plurality of bracing tabs fixed to the first and second longitudinal sides and the first and second lateral sides on the bottom side of the frame, the plurality of bracing tabs extended outwardly from the frame, the plurality of bracing tabs and the visual cutting guide configured to receive and sandwich longitudinal edges of a plurality of disposable support members, and wherein at least one of the plurality of disposable support members is releasably attached to each of the first and second longitudinal sides and the first and second lateral sides of the frame and makes abutting contact with the exterior surface of the roof to maintain the frame in the closed position, the visual cutting guide is configured to provide a visual indication of where the user should cut into the plurality of disposable support members with the cutting device, and the frame is pivotably attached to the exposed rafter via the pivot bar and the plurality of pivot bar brackets, the frame configured to pivot around the exposed rafter into the open position when the plurality of disposable support members are cut by the user with the cutting device.

\* \* \* \* \*